United States Patent
Hough

(10) Patent No.: US 6,316,891 B1
(45) Date of Patent: Nov. 13, 2001

(54) INTERLOCK CIRCUIT FOR A LAWN AND GARDEN TRACTOR

(75) Inventor: Barry Michael Hough, Beaver Dam, WI (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 09/639,226

(22) Filed: Aug. 15, 2000

(51) Int. Cl.$^7$ .............................. B60K 28/00; B60K 2/04; B60K 41/28

(52) U.S. Cl. ......................... 318/282; 318/139; 180/273; 192/94; 307/10.6

(58) Field of Search ..................................... 318/282, 139; 307/9.1, 10.6; 180/53.1, 273, 6.48, 269, 6.2, 271, 272; 192/91; 340/540, 541

(56) References Cited

U.S. PATENT DOCUMENTS

| | | | |
|---|---|---|---|
| 3,649,896 | * | 3/1972 | Mason et al. . |
| 3,838,748 | * | 10/1974 | Gray et al. . |
| 4,974,711 | * | 12/1990 | Peterson et al. . |
| 5,156,232 | * | 10/1992 | Muroya et al. . |
| 5,203,440 | * | 4/1993 | Peterson et al. . |
| 5,994,857 | * | 11/1999 | Peterson et al. . |
| 6,056,074 | * | 5/2000 | Heal et al. . |
| 6,189,646 | * | 2/2001 | Brandt et al. . |

\* cited by examiner

Primary Examiner—Paul Ip

(57) ABSTRACT

An interlock system for a lawn and garden tractor or similar vehicle includes a latching circuit with a two-pole seat switch and an operator push button switch connected to a latch relay to provide operator actuated mow in reverse feature. The system provides a latching function which is actuated by the operator each time the vehicle is put into reverse to facilitate mowing in reverse. If the vehicle is placed in reverse with the PTO turned on and without the push button switch being depressed, the engine will be disabled. Also, if the operator leaves the seat while the vehicle is mowing in reverse, the engine will be disabled. The circuit includes a two pole operator presence switch connected to the PTO switch and to the brake switch, respectively, to isolate the circuits for simplicity and ease of routing connecting lines to indicators.

7 Claims, 1 Drawing Sheet

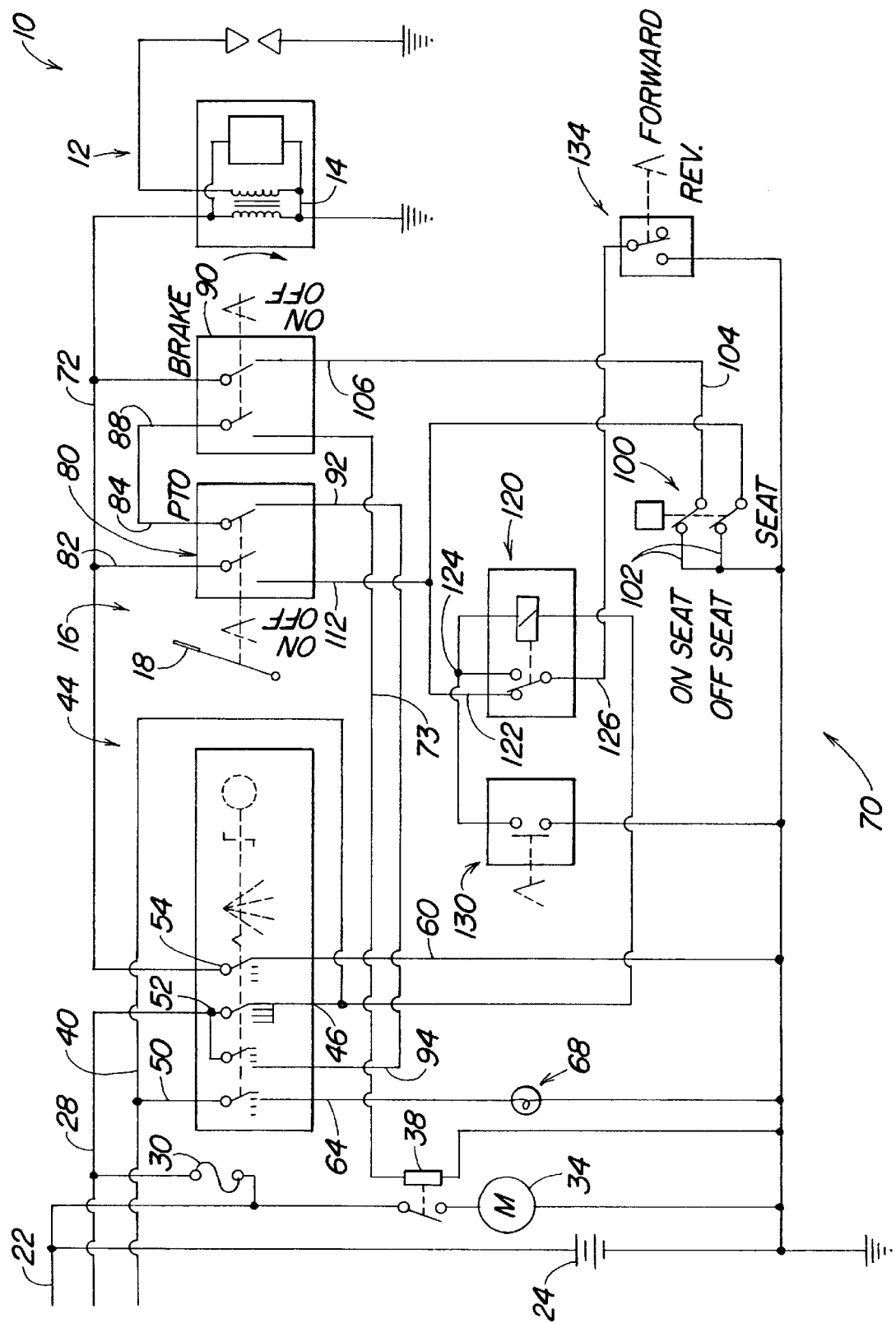

INTERLOCK CIRCUIT FOR A LAWN AND GARDEN TRACTOR

BACKGROUND OF THE INVENTION

1) Field of the Invention

The present invention relates generally to lawn and garden tractors or similar vehicles, and more specifically to an interlock circuit for such a vehicle.

2) Related Art

Vehicles such as some lawn and garden tractors with PTO driven attachments include an interlock circuit with several functions including the prevention of PTO operation when the vehicle is placed in reverse. Under certain conditions, operation of the PTO while the vehicle is in reverse is necessary. Various override systems have been proposed for this purpose, but many are difficult or inconvenient to operate. For example, one type of available override system on a mower allows PTO operation when the vehicle is backing up, but only after the PTO is automatically disconnected during the shift into reverse. Another type requires the operator to continuously push a switch during reverse operation. A further type is shown in U.S. Pat. No. 5,994,857 of common ownership with the present application, wherein several relays and a PTO switch provided with a momentary on position establish a temporary mow in reverse function. Prior circuits such as the one shown in the 5,994,857 patent commonly utilized a single pole seat switch and required extra circuitry to assure proper operation of interlock functions which rely on PTO, brake and operator presence conditions on the vehicle for enabling PTO operation in reverse. Providing an interlock circuit without need for multiple relays and with an override feature that is simple, convenient, and reliable has been a source of difficulty.

BRIEF SUMMARY OF THE INVENTION

It is therefore an object of the present invention to provide an improved interlock circuit for a lawn and garden tractor or similar vehicle. It is a further object to provide such an improved circuit which overcomes the aforementioned problems.

It is a further object of the present invention to provide an improved interlock circuit with an override function which facilitates PTO operation when the vehicle is in reverse provided certain operating conditions exist on the vehicle. It is yet another object to provide such an interlock circuit which does not require a large number of relays.

It is yet another object to provide an improved interlock circuit with a switch and latch circuit for operating the PTO under certain conditions when the vehicle is in reverse. It is a further object to provide such a circuit which does not require the operator to continuously push or hold the switch. It is a further object to provide such a circuit which permits an operator to shift the vehicle into reverse without having to restart the PTO if the operator depresses the switch when placing the vehicle in reverse.

It is another object of the present invention to provide an improved interlock circuit for selectively enabling PTO operation in reverse utilizing a two pole operator presence switch to isolate interlock functions and simplify the circuitry.

An interlock system constructed in accordance with the teachings of the present invention includes a latching circuit with a two-pole seat switch and an operator push button switch connected to a latch relay to provide operator actuated mow in reverse feature. The system provides a latching function which is actuated by the operator each time the vehicle is put into reverse to facilitate mowing in reverse. If the vehicle is placed in reverse with the PTO engaged and without the push button switch being depressed, the engine will be disabled. Also, if the operator leaves the seat while the vehicle is mowing in reverse, the engine will be disabled. The circuit is relatively simple and inexpensive and, as shown, requires only a single relay thereby eliminating the cost and complexity of multi-relay circuits. In addition, the operator presence switch is a two pole switch isolating the PTO switch from the brake switch so the circuitry permitting PTO operation in reverse and wiring of indicators can be simplified.

These and other objects, features and advantages of the present invention will become apparent to one skilled in the art upon reading the following detailed description in view of the drawings.

BRIEF DESCRIPTION OF THE DRAWINGS

The single drawing FIGURE shows a schematic of an interlock system for a vehicle such as a lawn and garden tractor, including a bypass circuit for operating the PTO while the vehicle is in reverse.

DETAILED DESCRIPTION OF THE DRAWINGS

Referring now to the drawing FIGURE, therein is shown circuit schematic for a vehicle such as a lawn and garden tractor 10 having an engine 12 with a magneto ignition system 14. The tractor has a conventional power take off (PTO) system 16 which, as shown in the figure, includes an operator control lever 18. Moving the lever to the position shown (the off position) towards the left connects drive from the engine 12 to an attachment such as a mower deck (not shown). A power line 22 is connected to the positive terminal of a battery 24. A second power line 28 is connected to the alternator on the vehicle and through a fuse 30 to the line 22. A starter motor 34 is connected through a start relay 38 to the line 22 so that when the relay 38 is activated, power is provided to the motor 34 to crank the engine 12. A switched power line 40 is connected to a main switch 44 via terminal 46 of the switch.

The main switch 44 is shown as a four pole, four position switch having a first input terminal 50, second and third connected input terminals 52 and a fourth input terminal 54. The switch 44 is shown in the off position wherein the terminals 50 and 52 are open, and the terminal 54 is connected to ground through an output terminal 60. In the next position of the switch 44 (the light/run position), the terminal 50 is connected to an output terminal 64 to connect the terminal to the switched power line 40, which is now connected via terminals 46 and 52 to the power line 28. A vehicle lighting system indicated generally at 68 is connected to the terminal 64 and is activated in the second position of the switch 44. The terminal 46, which is connected to power in all but the off position of the switch 44, is also connected to an interlock circuit indicated generally at 70. The terminal 54, which is connected to ground when the switch is in the off position (shown) and is open at the remaining three positions (light/run, run, and start), grounds the magneto ignition system 14 in the off position via line 72 to kill the engine. In the last position (start) of the switch 44, power is supplied to the relay 38 via line 73 to close the starting circuit and crank the engine if certain interlock functions are present on the vehicle to cause the interlock circuit to power a line 78 connected to the relay 38.

The interlock circuit 70 includes a PTO switch 80 having a first terminal 82 connected to the engine kill line 72 and a second terminal 84 connected to a first terminal 88 of a brake switch 90. An output terminal 92 of the switch 80 is connected to an output terminal 94 of the main switch 44 and is powered when the main switch is moved to the last or start position. The PTO switch 80 is in the position shown when the PTO is disengaged so that a closed circuit is provided between the power line 28 and the input terminal 88 of the brake switch 90. When the brake is off (shown), the input terminal 88 is open and the start relay 38 cannot be activated. However, when the brake is engaged and the PTO is off, power will be supplied to the line 73 via switches 80 and 90 when the main switch is moved to the start position.

A two pole seat switch 100 (shown in the position when no operator is present) has grounded output terminals 102 and includes a first input terminal 104 connected to output terminal 106 of the brake switch 90 and a second input terminal 108 connected to output terminal 112 of the PTO switch 80. The switch 100 opens to unground the terminals 102 when the operator assumes the proper position on the vehicle.

The interlock circuit 70 includes a latching circuit 120 having a first switched output 122 connected to the terminal 108 of the seat switch 100 and to the terminal 112 of the PTO switch 80. The latching circuit 120 also includes a second switched terminal 124 connected to the control input of a relay. The opposite terminal of the solenoid control for the latching circuit 120 is connected to the terminal 46 so it is powered whenever the switch 44 is moved from the off position. The terminal 124 is also connected to a terminal of an operator switch 130, which is a normally off, push button switch which grounds the terminal 124 when the button is pushed. The input terminal 126 of the circuit 120 is connected to the input terminal of a switch 134 connected to a direction control device on the vehicle. The switch 134 is open (shown) when the forward direction is selected and is closed to ground the terminal 126 when the reverse direction is selected.

In operation, assuming the vehicle is running and operating in the forward direction with the brake off (brake switch 90 is off), the line 72 is ungrounded so the engine remains operational. If the operator desires to move the vehicle in reverse without need to operate the PTO, the PTO is moved to the off position to open the line between the terminals 82 and 112 to prevent grounding of the line 72 and killing of the engine. If it is desired to operate the PTO while in reverse, the operator simply depresses the push button 130 to activate the latching circuit 120 as the switch 134 is closed with movement of the selector to the reverse position. The circuit 120 is then bootstrapped into the on position, and the line 112 is opened so the line 72 will not be grounded via terminals 122 and 126 and the reverse switch 134, provided the operator remains on the seat and the switch 100 remains open. Once the circuit 120 is bootstrapped on, the operator can release the switch 130 without killing the engine. If the operator forgets to depress the button before putting the vehicle in reverse, the line 72 will be grounded via 82, 112, 122, 126 and 134. However, the operator can quickly depress the button to activate the latching circuit 120 and enable the engine before the engine dies completely.

Having described the preferred embodiment, various changes can be made without departing from the scope of the claims.

What is claimed is:

1. In a lawn and garden vehicle having an engine, a power take off (PTO) for operating a driven accessory from the engine, the PTO including a PTO selector for engaging and disengaging the PTO, an operator station, a ground drive for providing vehicle drive and non-drive conditions including a selector for selecting either forward or reverse vehicle operation, an interlock circuit limiting operation of the vehicle under certain conditions, the interlock circuit comprising:

a PTO switch responsive to the engagement of the PTO;

a latch relay connected to the PTO switch;

a push button switch connected to the latch relay and having an activating position and a non-activation position;

an operator presence switch connected to the latch relay and a first condition when an operator is present on the vehicle and a second condition when an operator is not present on the vehicle;

a reverse responsive switch connected to the latch relay and the PTO switch for selectively preventing powering of the accessory by the PTO when reverse operation of the vehicle is selected; and wherein the push button, when in the activation position when the reverse operation is selected, maintains drive to the accessory when reverse operation is selected and the operator presence switch is in the first condition.

2. The interlock circuit as set forth in claim 1 wherein push button is biased to a non-activating position and, once reverse operation is selected while in the activation position, the latch relay maintains drive to the accessory when the push button is released to the non-activating position.

3. The interlock circuit as set forth in claim 1 wherein the interlock circuit comprises only one latch relay.

4. The interlock circuit as set forth in claim 1 further comprising an ignition kill circuit and a brake switch having brake on and brake off positions, and wherein the seat switch comprises a two pole switch having a first terminal connected to the PTO switch and a second terminal connected to a brake switch, and wherein the PTO switch provides engine kill when the PTO switch is set to power the accessory and the operator presence signal is not provided by the seat switch, and wherein the brake switch provides engine kill when in the brake off position and the operator presence signal is not provided.

5. The interlock circuit set forth in claim 1 wherein the latch relay has an input terminal connected to the reverse responsive switch, a first output connected to the PTO switch and a second output connected to the push button, and a control input connected to the second output and providing a latching function when the push button is in the activation position when the reverse operation is selected.

6. The interlock circuit as set forth in claim 5 wherein the seat switch includes a terminal connected to the first output of the latch relay.

7. The interlock circuit as set forth in claim 1 including a brake responsive switch connected to the PTO switch, and wherein the operator presence switch includes first and second poles connected to the PTO switch and to the brake responsive switch, respectively.

\* \* \* \* \*